US008935638B2

(12) United States Patent
Steiner et al.

(10) Patent No.: US 8,935,638 B2
(45) Date of Patent: Jan. 13, 2015

(54) NON-TEXTUAL USER INPUT (71) Applicants: Thomas Steiner, Hamburg (DE);
Arnaud Brousseau, Hamburg (DE)

(72) Inventors: Thomas Steiner, Hamburg (DE);
Arnaud Brousseau, Hamburg (DE)

(73) Assignee: Google Inc., Mountain View, CA (US)

( * ) Notice: Subject to any disclaimer, the term of this patent is extended or adjusted under 35 U.S.C. 154(b) by 47 days.

(21) Appl. No.: 13/649,956

(22) Filed: Oct. 11, 2012

(65) Prior Publication Data

US 2014/0108976 A1    Apr. 17, 2014

(51) Int. Cl.
| | | |
|---|---|---|
| G06F 3/00 | (2006.01) | |
| G06F 3/033 | (2013.01) | |
| G06K 9/62 | (2006.01) | |
| G06F 3/0481 | (2013.01) | |
| G06K 9/00 | (2006.01) | |
| G06F 3/0488 | (2013.01) | |

(52) U.S. Cl.
CPC .......... *G06F 3/0481* (2013.01); *G06K 9/00436* (2013.01); *G06F 3/04883* (2013.01)
USPC ............ 715/866; 715/705; 715/863; 382/209

(58) Field of Classification Search
None
See application file for complete search history.

(56) References Cited

U.S. PATENT DOCUMENTS

| | | | |
|---|---|---|---|
| 5,726,688 A * | 3/1998 | Siefert et al. .................. | 715/821 |
| 6,263,278 B1 | 7/2001 | Nikiel et al. | |
| 6,459,442 B1 * | 10/2002 | Edwards et al. .............. | 715/863 |
| 6,964,018 B1 * | 11/2005 | Masui ........................... | 715/259 |
| 7,181,695 B2 * | 2/2007 | Jaeger ........................... | 715/752 |
| 7,271,742 B2 | 9/2007 | Sheha et al. | |
| 7,561,740 B2 * | 7/2009 | Denoue et al. ................ | 382/187 |
| 7,711,474 B2 | 5/2010 | Mueller et al. | |
| 7,882,435 B2 * | 2/2011 | Kretz et al. .................... | 715/716 |
| 8,200,429 B2 | 6/2012 | Sasano | |
| 8,234,059 B2 | 7/2012 | Sugiyama et al. | |
| 8,332,141 B2 | 12/2012 | Couckuyt | |
| 8,448,095 B1 | 5/2013 | Haussila et al. | |
| 2004/0054428 A1 | 3/2004 | Sheha et al. | |
| 2005/0065717 A1 | 3/2005 | Mueller et al. | |
| 2005/0273761 A1 | 12/2005 | Torgerson | |
| 2008/0114538 A1 | 5/2008 | Lindroos | |

(Continued)

FOREIGN PATENT DOCUMENTS

EP    2141576 A2    1/2010

OTHER PUBLICATIONS

"Adobe Ideas for iPhone, iPod touch, and iPad on the iTunes App Store," Retrieved from https://itunes.apple.com/us/app/adobe-ideas/id364617858?mt=8, accessed Jan. 3, 2013, 3 pp.

(Continued)

*Primary Examiner* — Stephen Alvesteffer
(74) *Attorney, Agent, or Firm* — Shumaker & Sieffert, P.A.

(57) ABSTRACT

A computing device receives a first user input at presence-sensitive display of the computing device, wherein the first user input corresponds to a portion of a desired non-textual object. The device displays a first graphical representation indicating the first user input at the touchscreen display, and determines a first non-textual object suggestion based upon at least the first user input. The device displays a second graphical representation indicating the first non-textual object suggestion, wherein the second graphical representation of the first non-textual object suggestion is displayed differently than the first graphical representation of the first user input, and detects an indication whether the first non-textual object suggestion corresponds to the desired non-textual object.

17 Claims, 5 Drawing Sheets

(56) References Cited

U.S. PATENT DOCUMENTS

| | | |
|---|---|---|
| 2008/0260252 A1 | 10/2008 | Borgaonkar et al. |
| 2008/0312766 A1 | 12/2008 | Couckuyt |
| 2009/0228207 A1 | 9/2009 | Sasano |
| 2010/0060586 A1* | 3/2010 | Pisula et al. ............ 345/169 |
| 2010/0114471 A1 | 5/2010 | Sugiyama et al. |
| 2010/0153890 A1 | 6/2010 | Wang et al. |
| 2010/0278504 A1* | 11/2010 | Lyons et al. ............ 386/52 |
| 2010/0311470 A1* | 12/2010 | Seo et al. ............ 455/566 |
| 2011/0061013 A1* | 3/2011 | Bilicki et al. ............ 715/771 |
| 2011/0154193 A1* | 6/2011 | Creutz et al. ............ 715/261 |
| 2011/0175821 A1* | 7/2011 | King ............ 345/173 |

OTHER PUBLICATIONS

"Dextexify$^2$—LaTeX syambol classifer," Retrieved from http://detexify.kirelabs.org/classify.html, accessed on Jan. 3, 2012, 2 pp.

International Search Report and Written Opinion of International Application No. PCT/US2013/060834, mailed Jan. 21, 2014, 13 pp.

\* cited by examiner

NON-TEXTUAL USER INPUT

BACKGROUND

Presence-sensitive displays such as touchscreen displays are able to detect a presence or a touch within the active area typically overlaying a display, such as detecting whether a finger is present pressing a fixed-image touchscreen button or detecting the presence and position of a finger. Some presence-sensitive displays can also detect the presence of elements other than a finger, such as a stylus used to generate a digital signature, select objects, or perform other functions.

Use of a presence-sensitive display allows an electronic device to change a display image, and to present different buttons, images, or other regions that can be selected, manipulated, or actuated by touch. Presence-sensitive displays such as touchscreens can therefore provide an effective user interface for cell phones, Global Positioning System (GPS) devices, personal digital assistants (PDAs), computers, Automated Teller Machines (ATMs), and other devices.

Presence-sensitive displays use various technologies to sense touch from a finger or stylus, such as resistive, capacitive, infrared, and acoustic sensors. Resistive sensors rely on touch to cause two resistive elements overlapping the display to contact one another completing a resistive circuit, while capacitive sensors rely on the presence of a finger changing the capacitance detected by an array of elements overlaying the display device. Infrared and acoustic touchscreens similarly rely on a finger or stylus to interrupt infrared or acoustic waves across the screen, indicating the presence and position of a touch.

Capacitive and resistive touchscreens often use transparent conductors such as Indium tin oxide (ITO) or transparent conductive polymers such as PEDOT to form an array over the display image, so that the display image can be seen through the conductive elements used to sense touch. The size, shape, and patter of circuitry have an effect on the resolution and accuracy of the touchscreen, as well as on the visibility of the circuitry overlaying the display. Other materials, such as fine line metal elements are not optically transparent but rely on their small physical width to avoid being seen by a user.

One common application for presence-sensitive displays is presentation of keyboards, numeric keypads, and other input displays on mobile devices such as cellular telephones or "smart" phones. Presence-sensitive displays can also enable a user to provide input by drawing shapes or making gestures, such as by pinching in or out on a displayed object to perform a zoom, or by drawing a graphical object. But, drawing shapes with a finger can be imprecise and slow, and it is therefore desirable to facilitate better touchscreen input using such methods.

SUMMARY

In one example embodiment, a computing device receives a first user input at a presence-sensitive display of the computing device, wherein the first user input corresponds to a portion of a desired non-textual object. The device displays a first graphical representation indicating the first user input at the touchscreen display, and determines a first non-textual object suggestion based upon at least the first user input. The device displays a second graphical representation indicating the first non-textual object suggestion, wherein the second graphical representation of the first non-textual object suggestion is displayed differently than the first graphical representation of the first user input, and detects an indication whether the first non-textual object suggestion corresponds to the desired non-textual object.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how these examples may be applied to various purposes or embodiments. Other embodiments exist, and logical, mechanical, electrical, and other changes may be made without departing from the subject or scope. Features or limitations of various embodiments described herein, however essential to the example embodiments in which they are incorporated, do not limit other embodiments, and any reference to the invention, its elements, operation, and application do not limit the invention as a whole but serve only to define these example embodiments. The following detailed description does not, therefore, limit the scope of the claims, but serve only as examples.

Presence-sensitive displays such as touchscreen displays are often used as interfaces on small electronic devices such as smart phones, tablets, Global Positioning System (GPS) devices, and other such electronic systems because the display behind the touchscreen can be easily adapted to provide instruction to the user and to receive various types of input, thereby providing an intuitive interface that requires very little user training to effectively use. Inexpensive and efficient touchscreen technologies enable incorporation of touchscreens into common consumer electronic devices, and provide a versatile and durable alternative to fixed input keys.

A typical cellular telephone touchscreen display, for example, can be configured to display a traditional "QWERTY" keyboard, and allow a user to type by selectively actuating the touchscreen portion overlaying each key. Similarly, a user can use the touchscreen to draw various shapes, such as by tracing a finger or stylus across a screen. But, shapes drawn by finger, particularly on small screens with high resolution such as are provided by a typical smart phone, can result in imprecise drawings having jerky or segmented lines. Drawing such shapes in their entirety can also be tedious, given the small size and high resolution of many such devices, and the relatively large size of a finger drawing on a touchscreen that covers the shape as it is being drawn.

Some embodiments therefore provide for recognition of non-textual drawn objects based on a user's touchscreen input to a computing device. For example, as a user is drawing a non-textual object such as a circle, the computing device may display a suggested non-textual object based on the received user input. The suggested non-textual object is displayed on the touchscreen display having a property indicating that the suggested non-textual object is a suggestion (e.g., at least partially faded or lighter in color). In a further example, the computing device may detect a user input (e.g., an acceptance event or a rejection event) indicating whether the suggested non-textual object corresponds to a desired non-textual object (e.g., what the user was attempting to draw). The rejection input indicates that that the suggested non-textual object does not correspond to the desired non-textual object. The computing device can then provide another suggested non-textual object based on the user input, until a suggested non-textual object is accepted or a shape is drawn. The acceptance input indicates that the suggested non-textual object corresponds to the desired non-textual object. The suggested non-textual object is then displayed on the touchscreen display, and in further examples may be moved, resized, colored, or otherwise modified based on the user's input.

Such a non-textual object recognition system may provide suggested non-textual objects while the user is providing the input, thereby saving the user from having to draw the entire shape. This can be a significant savings of time and result in a more precisely presented shape in examples where the shape has some complexity and can be difficult to accurately draw with a finger, such as a star with no internal lines or a polygon with many sides such as a pentagon. By analyzing the input from a user and providing the non-textual object suggestions, the recognition system may score each incomplete input based on various weighted recognition components, and may select one of the non-textual objects for a suggestion based on the score. The recognition system receives acceptance or rejection input from the user indicating a suggested non-textual object is the intended shape, or in an alternate example chooses from among multiple suggested non-textual objects presented on the display such as by pressing a button with the desired non-textual object presented thereon.

Figure 1:
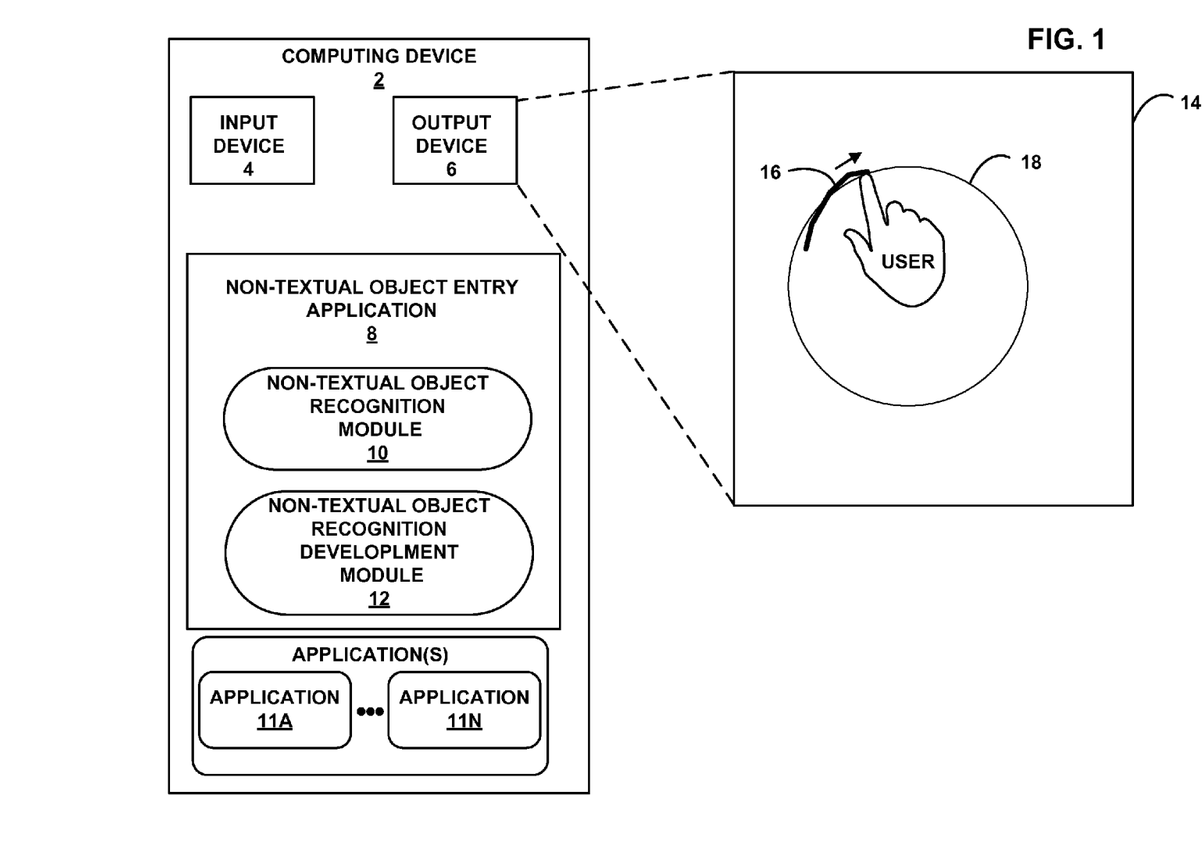
FIG. 1 is a block diagram illustrating a computing device that may execute one or more applications and receive a user input, consistent with an example embodiment.

FIG. 1 is a block diagram illustrating a computing device that may execute one or more applications and receive a user input, consistent with an example embodiment. Here, a computing device 2 comprises one or more stand-alone devices or may be part of a larger system, such as a client-server system. In certain examples, computing device 2 may comprise a mobile device. Examples of computing device 2 can include, but are not limited to, portable or mobile devices such as cellular phones, tablet computers, personal digital assistance (PDAs), portable gaming devices, portable media players, and e-book readers, as well as non-portable devices such as desktop computers. In some instances, computing device 2 may communicate with external, distinct devices via one or more networks (not shown), such as one or more wired or wireless networks, which may, in some cases, provide access to the Internet.

As illustrated in FIG. 1, computing device 2 includes one or more applications 11A-11N (collectively "applications 11") and a non-textual object entry application 8. Applications 11 and non-textual object entry application 8 may be executed by computing device (e.g., by one or more processors included within computing device 2, as described in more detail with respect to FIG. 2). The non-textual object entry application is in some embodiments a standalone application, such as a drawing program, while in other embodiments is part of another program, or is a service such as a touchscreen input driver, that may be employed by a variety of other programs.

In still other examples, the non-textual object entry application 8 includes one or more hardware components, such as a touchscreen controller integrated circuit.

The applications 11 perform a variety of functions, such as browsing the web or providing other connectivity to the Internet, receiving user input to create drawings, providing for photo editing, or other such functions. A variety of such applications can receive user input through the touchscreen, including by drawing non-textual graphical input that is then displayed on the computing device's screen.

During execution, any of applications 11 may implement, invoke, execute, or otherwise utilize non-textual object entry application 8 as a mechanism to obtain user input that may then be displayed in one or more graphical character areas and provided to the corresponding one or more of applications 11. For instance, if application 11A is a text message application, application 11A may invoke execution of non-textual object entry application 8 to allow a user to enter a message that includes a non-textual object, which is displayed as a graphical object and sent as an MMS message graphic accompanying any entered text. In another example, application 11A is a photo editing application, and non-text shapes and other non-text input are received via non-textual object entry application 8 to modify or edit a drawing or photo.

As illustrated in FIG. 1, computing device 2 includes input device 4, such as a touchscreen overlay on a display, and output device 6, such as a display. As a user draws by touching a finger to the touchscreen and moving the finger, the display shows where the user's finger has touched, creating non-text graphical input as shown at 16. The non-textual object entry application 8 generates and displays a non-textual object suggestion, as shown at 18, which here indicates that the non-textual object entry application has estimated that the user is trying to draw a circle.

Input device 4 in some examples is a touchscreen overlaying a display, but in other examples is another input device such as a touchpad, trackball, trackpoint, mouse, or other mechanism for a user to provide non-textual input in multiple dimensions to the computing device 2. Similarly, output device 6 is in some examples a display, but in other examples is a printer or other form of output device.

Non-textual object entry application 8 includes in this example a non-textual recognition module 10 that is operable to detect the user's drawn input 16, and recognize or estimate a shape the user is drawing from among a number of known shapes. For example, the user drawing arc 16 is here estimated to be drawing a circle 18, but may also be drawing another common shape such as an ellipse, a heart, or another shape having a curved portion such is approximately shown at 16.

But, the shape being drawn by the user may not be quickly recognized by the non-textual recognition module 10, or may not be any shape known to the non-textual recognition module 10. This example therefore further includes a non-textual object recognition development module 12, which is operable to learn new shapes, and to learn to more quickly recognize a user's attempt to draw a known shape. The non-textual object entry application 8 can therefore provide improved performance for a particular user as it learns over time, or in a further example can share such learned information with a server and receive learned information from other users' non-textual object entry applications to provide improved performance based on the actions of many users.

Figure 2:
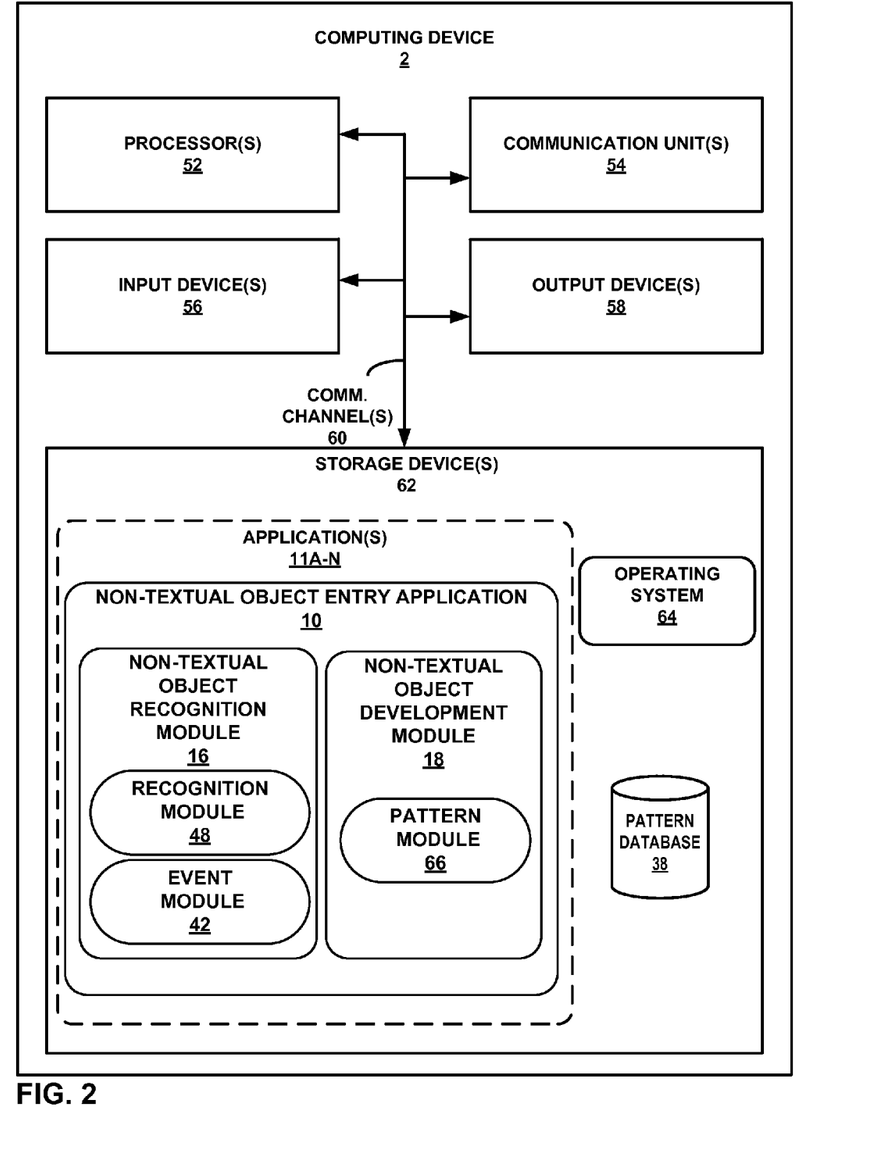
FIG. 2 is a block diagram illustrating further details of one example of the computing device shown in FIG. 1, consistent with an example embodiment.

FIG. 2 is a block diagram illustrating further details of one example of the computing device shown in FIG. 1, consistent with an example embodiment. Here, a processor is operable to execute program instructions loaded from a storage device 60 or received via communications unit 54 such as a wireless Internet or cellular data network connection. Input devices 56 such as a keyboard, switches or buttons, and a touchscreen are used to provide input, while output devices 58 such as a speaker, a display, and a vibration module are used to provide output to the user.

Storage device 60 is a machine-readable medium such as a hard disk drive, flash memory, or other non-transitory storage device upon which information can be stored. Here, the storage device 60 stores an operating system 64 that is loaded when the device is powered on, and facilitates installation and execution of applications, interaction between applications and hardware devices, and common system services.

In this example, one or more of applications 11A-N include a non-textual object entry application 10. In alternate embodiments, the non-textual object entry application 10 is provided as part of the operating system, in hardware, or through another mechanism. Here, the non-textual object entry application 10 includes a non-textual object recognition module 16, operable to recognize or estimate a non-text shape or object being drawn, and an event module 42 operable to provide suggestions such as by drawing a recognized shape, and to prompt the user for input to accept or decline the suggested shape.

The non-textual object entry application 10 further includes a non-textual object development module 18, enabling the non-textual object entry application 10 to learn to recognize new patterns via pattern module 66. The patterns used by the non-textual object recognition module 15 and created by the non-textual object development module 18 are stored in a pattern database 38, which therefore includes in this example a combination of provided and learned non-text patterns.

Figure 3A:
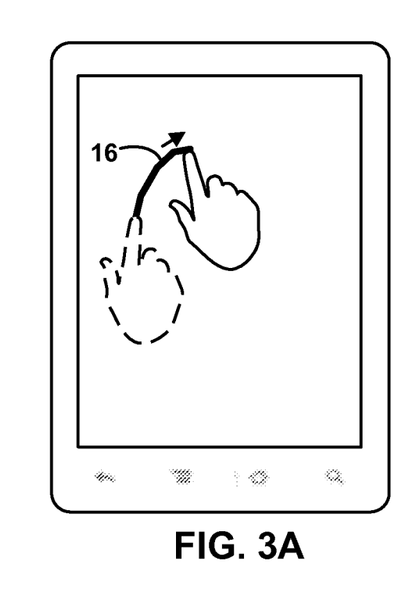
FIGS. 3A-3C illustrate suggestion of a non-textual object based on a user input, consistent with an example embodiment.
Figure 3B:
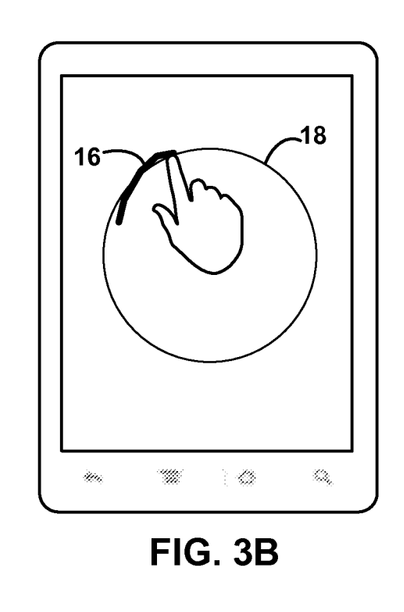
Figure 3C:
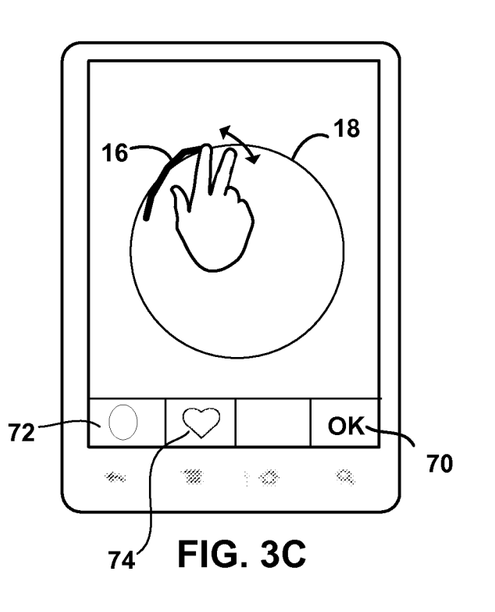

FIGS. 3A-3C illustrate suggestion of a non-textual object based on a user input, consistent with an example embodiment. Referring to FIG. 3A, a finger begins to contact the touchscreen display on the mobile device shown when the hand is in the position illustrated by the dashed line hand, and the finger traces out an arc as shown at 16. This input is received by the mobile device, which in this example presents the drawn arc 16 on the display of the device.

The non-textual object recognition module of FIGS. 1 and 2 is then employed to recognize the shape being drawn based on the arc 16, and a recognized or estimated shape is displayed to the user. This is shown in FIG. 3B, which illustrates that the arc 16 is estimated to be part of a circle 18, despite the somewhat jagged nature of the arc and inconsistent radius of curvature. Here, the size and position of the circle 18 are a best fit of the drawn arc 16, based on the position of the arc 16 and the average radius of curvature over the arc.

In a further example, the user is presented with buttons enabling the user to accept the drawn circle 18 as the object the user intended to draw, such as by pressing "OK" button 70 as shown in FIG. 3C. The button row presented as part of the non-textual object recognition application in this example further includes a selection of alternate shapes that the user may be intending to draw, such as an ellipse 72 or a heart 74.

The user can therefore hit the "OK" button shown at 70 to accept the circle 18, can select one of the alternate shapes including oval 72 or heart 74, or can continue to draw the shape if the intended shape is not presented as an option. Once the object is selected, the selected object may be positioned, scaled, or otherwise manipulated by the user so that the shape looks as the user intends.

Figure 4A:
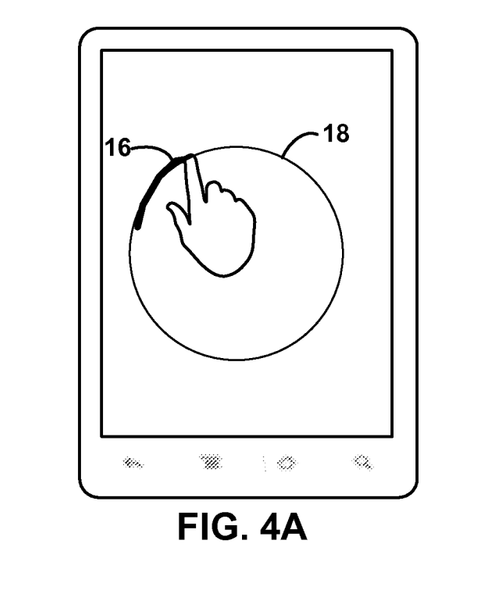
FIGS. 4A-4C illustrate presentation and selection of suggested non-text object recognition objects, consistent with an example embodiment.
Figure 4B:
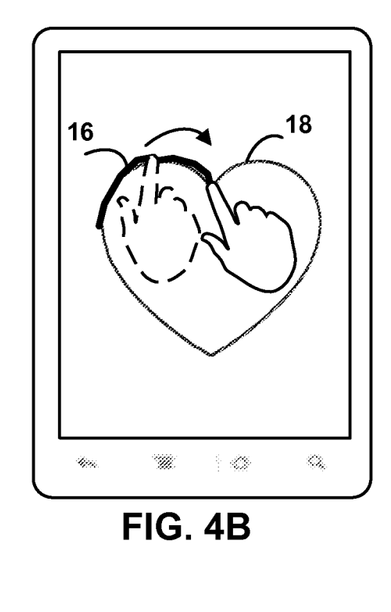
Figure 4C:
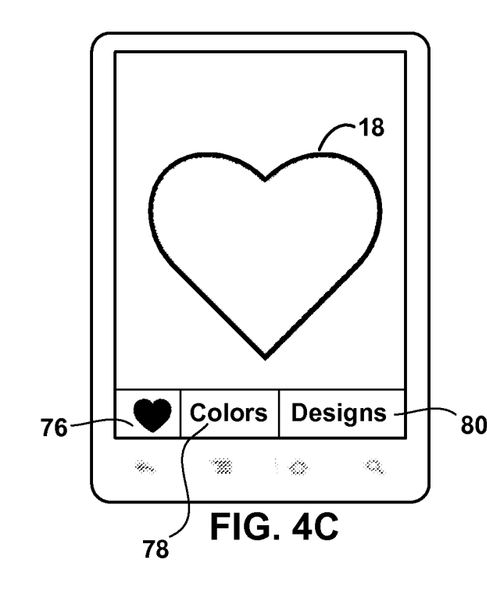

FIGS. 4A-4C illustrate presentation and selection of suggested non-text object recognition objects, consistent with an example embodiment. Here, a user draws an arc 16 on a smart phone device, as in FIGS. 1 and 3. Referring to FIG. 4A, the user begins to draw an arc, as shown at 16. The mobile device's non-textual object recognition module first estimates the arc to be a part of a standard circle, and draws such a circle as shown at 18 as a suggested shape. Because the desired shape in this example is a heart, the user continues drawing the desired shape as shown at 16 in FIG. 4B. The shrinking radius of the arc as it progresses toward the point at which the finger is shown in FIG. 4A suggests to the non-textual object recognition module that the shape may not be a circle, but may be another shape such as a heart or oval. The mobile device's non-textual object recognition module suggests the expanded arc 16 may be a part of a heart by drawing a heart as shown at 18, and the user stops drawing. The non-textual object recognition module then draws the remainder of the recognized heart object as shown at 18 in FIG. 4C, completing the drawing.

In this example, the non-textual object recognition module further provides various options for modifying the completed heart shape, such as dragging the shape with a finger to move it, pinching to expand or contract the size of the heart, and changing other characteristics of the heart. The user may select a touchscreen button such as 76 to fill in the object with a solid color, may select button 78 to change the color of the object outline or fill color, or may select button 80 to change the object outline or fill the object with a pattern or design.

Although the previous examples illustrate user selection of a desired shape from a menu or drawing until the desired shape is presented, other examples employ other methods of selecting a desired object. In some such examples, a user may shake the mobile device, provide a swipe gesture, press a hardware button on the device, or perform another such action to indicate acceptance of the suggested object. Such an action may cause the non-textual object recognition module to suggest another shape until the correct shape is presented and the user accepts the shape, which may be indicated by a variety of actions such as shaking, swiping, pressing a button, or other action. In another example, a first suggested object is displayed for a predetermined period of time during which the user may accept the suggested object, and after the predetermined period of time passes a different suggested object is displayed, implying user rejection of the first suggested object.

Recognition of the correct object can be performed using any of a number of suitable methods, such as employing a best-fit algorithm comparing the drawn shape to a library or database of potential or likely shapes. In a further example, the algorithm is weighted toward more common shapes such as rectangles and circles, as such shapes are more likely to be drawn than similar shapes such as slightly trapezoidal or oval shapes. The non-textual object recognition module in further examples performs other functions, such as learning new shapes, smoothing jagged curves on hand-drawn shapes, or other functions helpful in producing accurate estimations of a user's drawn object.

In a more detailed example, the drawn user shape is compared to one or more members of a set or database of non-textual graphical objects, and is ranked against the one or more non-textual graphical objects based on a comparison between the user's drawn shape and each of the one or more non-textual graphical objects. Ranking may use any suitable algorithm, such as a best-fit algorithm, and in a further embodiment may scale, rotate, or otherwise modify the drawn image to generate the highest best-fit ranking score for each non-textual graphical object in the set or database.

In another example, at least one property of the drawn user shape is compared to a corresponding property of the one or more non-textual graphical objects in the set or database.

Such properties include in some examples congruency between the first graphical representation of the first input and a portion of the one or more non-textual objects, a percentage of the one or more non-textual objects that matches the first graphical representation of the first input, frequency of the one or more non-textual objects being selected when the first input is received, and an order associated with the first user input. This enables the non-textual object recognition module to make an appropriate non-textual object suggestion, anticipating what the user is drawing.

Techniques described herein are combined in some embodiments, such as where two or more described methods are employed. In a more detailed example, a weighted average of two such methods, such as a percentage match between the drawn object and the one or more non-textual objects in the database is computed, along with the frequency of the one or more non-textual objects being selected when the first input is received. The weighted average is then used to select the non-textual object from the set or database that is the best match to the drawn object.

Figure 5:
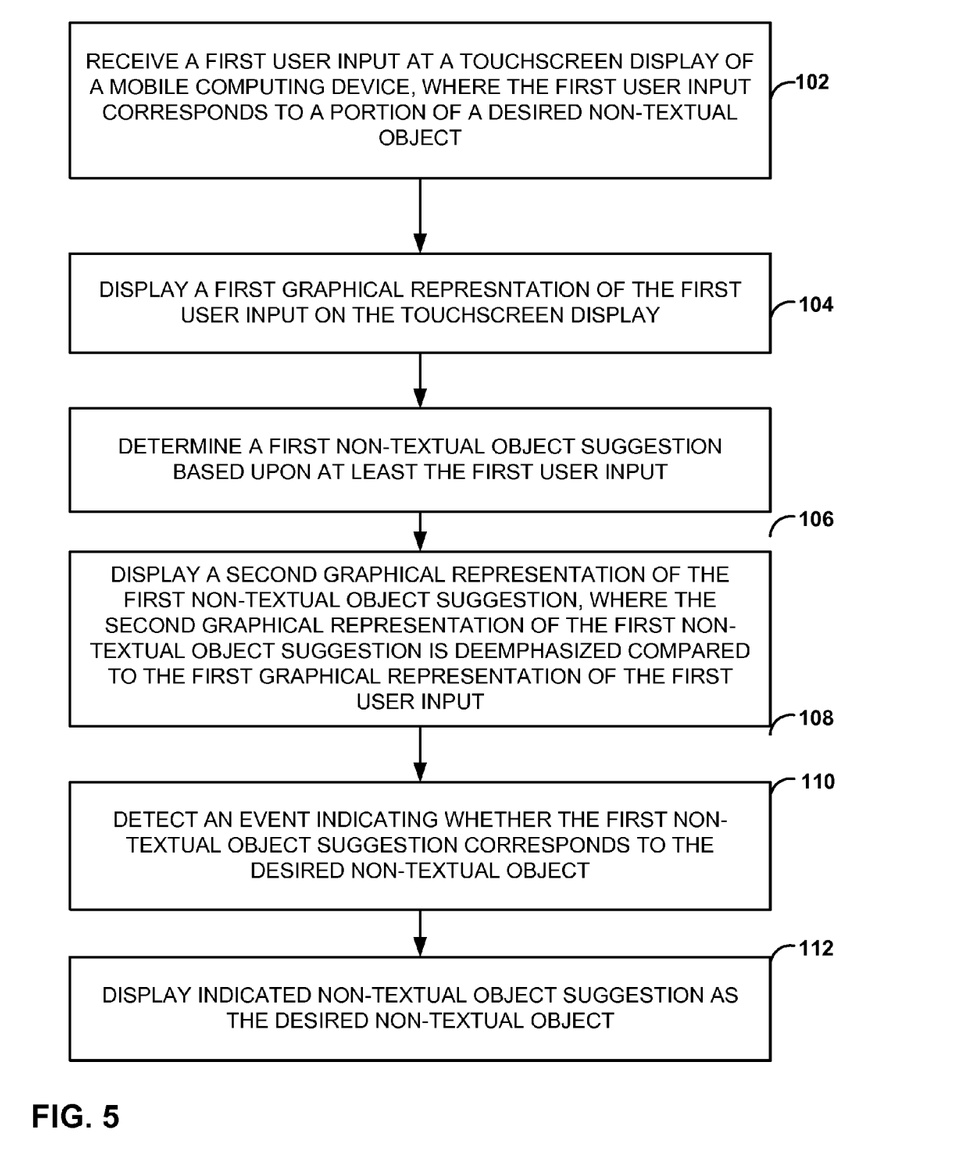
FIG. 5 is a flow chart illustrating an example method that may be performed by a computing device to provide suggested non-textual objects based on a user input, consistent with an example embodiment.

FIG. 5 is a flowchart illustrating a method of recognizing a non-textual graphic object drawn by a mobile device user, consistent with an example embodiment. At 102, a first user input is received at a touch-sensitive display of a mobile computing device. The input is received in a drawing entry tool, and the input corresponds to a portion of a desired non-textual object.

The drawn input is displayed as a first graphical representation of the first user input on the touch-sensitive screen at 104, and a non-textual object recognition module in the mobile device determines a first non-textual object suggestion based on the first user input at 106. The suggested object is displayed at 109 as a second graphical representation, in a manner such that the suggested object is deemphasized relative to the first graphical representation of the user input. This enables the user to clearly distinguish what has been drawn on the touchscreen display from the object that the non-textual object recognition module is suggesting as a likely object being drawn.

The mobile device then detects an event indicating whether the first non-textual object suggestion corresponds to the desired non-textual object at 110, such as by the user stopping drawing, pressing a button, selecting the object from a presentation of two or more objects, performing a swipe or shaking motion, or other such input. When the user has provided input indicating the desired non-textual object, the mobile device displays the indicated non-textual object as a complete object at 112, removing the previous distinction between drawn and suggested portions of the object previously presented as distinct first and second graphical representations.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory or tangible media. The term "non-transitory" may indicate that the storage medium is not embodied in a carrier wave or a propagated signal. In certain examples, a non-transitory storage medium may store data that can, over time, change (e.g., in flash memory).

The example embodiments presented here illustrate how a computerized device can be employed to recognize and predict non-textual objects drawn using a touchscreen, improving the speed and accuracy with which a drawn non-textual object can be produced. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the embodiments described herein.

The invention claimed is:

1. A method, comprising:
   receiving, by a computing device, an indication of a user input received at a presence-sensitive input device, wherein the user input corresponds to a portion of a desired non-textual object;
   determining, by the computing device, based at least in part on the user input, a non-textual object suggestion;
   outputting, by the computing device, for display, a graphical representation of the user input and the non-textual object suggestion, the non-textual object suggestion having a property that visibly indicates that the non-textual object suggestion is not a completed object;
   receiving, by the computing device, an indication of whether the non-textual object suggestion corresponds to the desired non-textual object; and
   in response to determining that the indication indicates that the non-textual object suggestion corresponds to the desired non-textual object:

outputting, by the computing device, for display, the non-textual object suggestion as the completed object; and removing, by the computing device, from display, the graphical representation of the user input.

2. The method of claim 1, wherein determining the non-textual object suggestion further comprises:

comparing, by the computing device, the graphical representation of the user input to a plurality of non-textual objects;

ranking, by the computing device, the plurality of non-textual objects based at least on the comparison of the graphical representation of the user input to the plurality of non-textual objects; and selecting, by the computing device, based at least in part on the ranking of the plurality of non-textual objects, a particular non-textual object from the plurality of non-textual objects as the non-textual object suggestion.

3. The method of claim 2, wherein for each respective non-textual object from the plurality of non-textual objects, a rank of the respective non-textual object is based at least in part on how closely the graphical representation of the user input matches a portion of the respective non-textual object.

4. The method of claim 2, wherein for each respective non-textual object from the plurality of non-textual objects, a rank of the respective non-textual object is based on at least one of: congruency between the graphical representation of the user input and a portion of the respective non-textual object, a percentage of the respective non-textual object that matches the graphical representation of the user input, a frequency of the respective non-textual object being selected when indications of user input are received, and an order associated with the user input.

5. The method of claim 1, wherein receiving the indication of whether the non-textual object suggestion corresponds to the desired non-textual object comprises: further includes:

receiving, by the computing device, an indication that the non-textual object suggestion corresponds to the desired non-textual object.

6. The method of claim 5, wherein receiving the indication that the non-textual object suggestion corresponds to the desired non-textual object comprises:

receiving, by the computing device, an indication of an acceptance gesture at a defined area of the presence-sensitive input device.

7. The method of claim 5, wherein further comprising: determining, by the computing device, that the indication indicates that the non-textual object suggestion corresponds to the desired non-textual object when a user has stopped drawing.

8. The method of claim 1, wherein outputting the non-textual object suggestion as the completed object comprises:

outputting, by the computing device, for display, an altered version of the non-textual object suggestion.

9. The method of claim 8, wherein the altered version of the non-textual object suggestion emphasizes the non-textual object suggestion.

10. The method of claim 9, wherein the method further comprises:

in response to receiving an indication that the non-textual object suggestion corresponds to the desired non-textual object, outputting, by the computing device, for display, options for a user to alter characteristics of the completed object, wherein the characteristics include at least one of color, shading, size, and visual effects.

11. The method of claim 1, further comprising determining, by the computing device, that the indication indicates that the non-textual object suggestion does not correspond to the desired non-textual object when the indication comprises a swipe gesture across the presence-sensitive input device.

12. The method of claim 1, further comprising determining, by the computing device, that the indication indicates that the non-textual object suggestion does not correspond to the desired non-textual object when the indication comprises an indication of a shaking of the computing device.

13. The method of claim 1, wherein:

the user input is a first user input; and the method further comprising determining, by the computing device, that the indication indicates that the non-textual object suggestion does not correspond to the desired non-textual object when the computing device receives an indication of a second user input that deviates from the non-textual object suggestion.

14. The method of claim 1, wherein receiving the indication of whether the non-textual object suggestion corresponds to the desired non-textual object comprises:

determining, by the computing device, whether an acceptance event has been detected within a time period; and responsive to determining that the acceptance event has not occurred within the time period, determining, by the computing device, that the non-textual object suggestion does not correspond to the desired non-textual object.

15. The method of claim 1, wherein:

the non-textual object suggestion is a first non-textual object suggestion, and the method further comprises:

determining, by the computing device, a second non-textual object suggestion based on the user input; and outputting, by the computing device, for display, a graphical representation of the second non-textual object suggestion, wherein the graphical representation of the second non-textual object suggestion is deemphasized compared to the graphical representation of the user input.

16. A non-transitory machine-readable medium with instructions stored thereon, the instructions, when executed, are operable to cause a computerized system to:

determine, based at least in part on user input received at a presence-sensitive input device, a non-textual object suggestion, wherein the user input corresponds to a portion of a desired non-textual object;

output, for display, a graphical representation of the user input and the non-textual object suggestion, the non-textual object suggestion having a property that visibly indicates that the non-textual object suggestion is not a completed object;

in response to receiving an indication that the non-textual object suggestion corresponds to the desired non-textual object:

output, for display, the non-textual object suggestion as the completed object; and remove, from display, the graphical representation of the user input.

17. A computing device comprising one or more processors and one or more computer-readable storage media encoded with instructions that, when executed by the one or more processors, cause to computing device to:

determine, based at least in part on user input received at a presence-sensitive input device, a non-textual object suggestion, wherein the user input corresponds to a portion of a desired non-textual object;

output, for display, a graphical representation of the user input and the non-textual object suggestion, the non-textual object suggestion having a property that visibly indicates that the non-textual object suggestion is not a completed object;

in response to receiving an indication that the non-textual object suggestion corresponds to the desired non-textual object:

output, for display, the non-textual object as the completed object; and     remove, from display, the graphical representation of the user input.

\* \* \* \* \*